(12) United States Patent
Kamisawa et al.

(10) Patent No.: US 7,577,079 B2
(45) Date of Patent: Aug. 18, 2009

(54) MASTER DISK FOR MAGNETIC TRANSFER

(75) Inventors: Shiho Kamisawa, Odawara (JP); Kenji Ichikawa, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 705 days.

(21) Appl. No.: 11/377,323

(22) Filed: Mar. 17, 2006

(65) Prior Publication Data

US 2006/0210840 A1   Sep. 21, 2006

(30) Foreign Application Priority Data

Mar. 17, 2005   (JP)   .............................. 2005-077713

(51) Int. Cl.
    *G11B 7/24*   (2006.01)
(52) U.S. Cl. .............. 369/275.1; 369/13.35; 428/848.5; 360/131
(58) Field of Classification Search .............. 369/275.1, 369/275.2, 275.3, 275.4, 101, 13.43, 13.48, 369/110.03; 428/848.5, 848.6, 848.7, 848.8
    See application file for complete search history.

(56) References Cited

U.S. PATENT DOCUMENTS 6,759,183 B2   7/2004   Nagao et al.

2001/0028964 A1   10/2001   Nagao et al.
2003/0198833 A1   10/2003   Nagao et al.
2005/0018335 A1*  1/2005   Fujiwara et al. ................ 360/17

FOREIGN PATENT DOCUMENTS

EP   1688927 A2   8/2006
JP   2001-256644 A   9/2001

* cited by examiner

*Primary Examiner*—Tan X Dinh
*Assistant Examiner*—Andrew J Sasinowski
(74) *Attorney, Agent, or Firm*—Sughrue Mion, PLLC

(57) ABSTRACT

The present invention provides a master disk with high flexibility and high close contact property with a slave disk to be transferred, which bears information to be transferred by magnetic transfer. When incident angle of X-ray is designated by θ, electroforming is performed such that X-ray diffraction pattern of the master substrate 11 has a 200 plane reflection at 2θ=51.0° to 53.0°, and a 220 plane reflection at 2θ=75.5° to 76.5°, and the reflection intensity ratio of X-ray diffraction of the 220 plane with respect to the 200 plane is I[220]/I[200]=2 to 30.

8 Claims, 9 Drawing Sheets

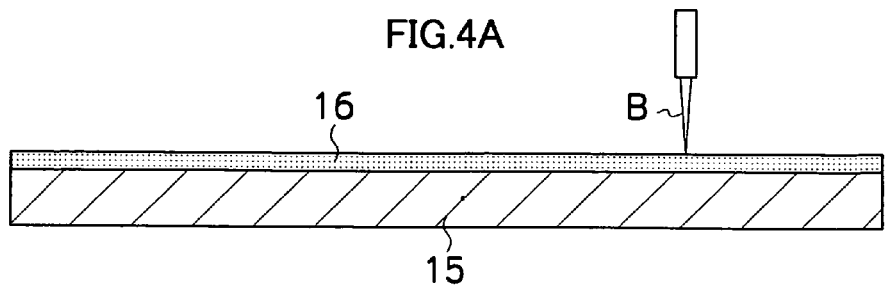
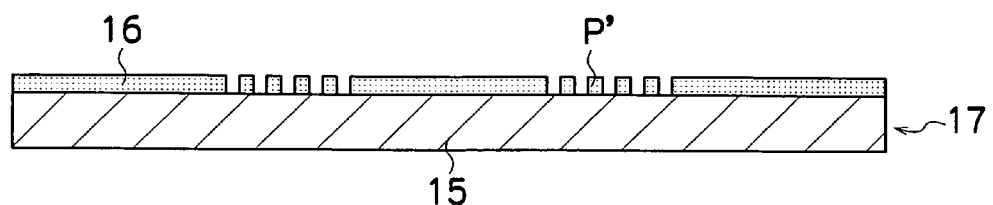
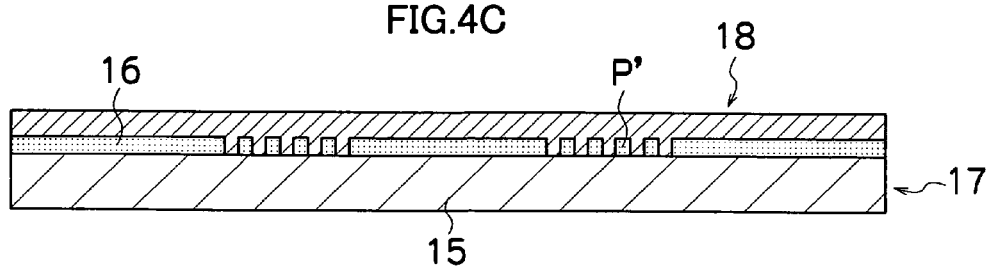
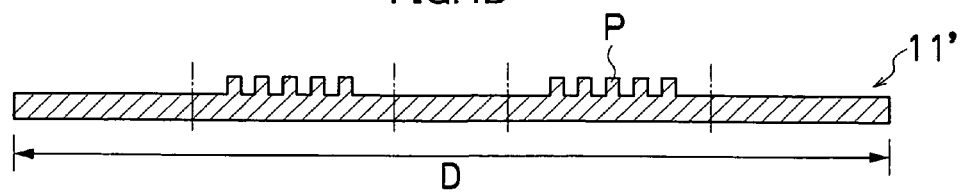
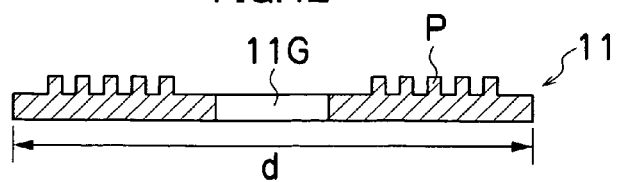

MASTER DISK FOR MAGNETIC TRANSFER

BACKGROUND OF THE INVENTION

1. Field of the Invention

The present invention relates to a master disk for magnetic transfer, in particular, relates to a master disk for magnetic transfer suitable for transferring magnetic information such as format information to a magnetic disk used for a hard disk device or the like.

2. Description of the Related Art

In a magnetic disk (hard disk) used in a hard disk drive rapidly diffused recently, format information or address information are written, generally, after it is delivered from a magnetic disk maker to a drive maker and before it is assembled to the drive. The writing can be performed by a magnetic head, but a method for transferring the information collectively from a master disk in which the format information or the address information is written, is effective and preferable.

The magnetic transfer method for collectively transferring, magnetically transfers information (for example, a servo signal) included in the master disk to a slave disk by disposing a magnetic field generating device such as an electromagnet device and a permanent magnet device to apply a transfer magnetic field on one or both surfaces, while allowing the master disk and the disk (slave disk) to be transferred to be in close contact with each other. In addition, in order to perform magnetic transfer accurately, it is very important to allow the master disk and the slave disk to be in close contact with each other evenly and without spacing.

As the master disk used for the method for magnetic transfer, a disk in which a concavo-convex pattern corresponding to information signal is formed on the substrate surface, and a magnetic layer is coated on the surface of the concavo-convex pattern, is generally used. The master disk for magnetic transfer is generally manufactured by coating a magnetic layer on the surface of the concavo-convex pattern, after the steps of: electroforming on an original plate in which information is formed with the concavo-convex pattern, and for laminating a metal disk made of the electroformed layer on the original plate to transfer the concavo-convex pattern on the metal disk; releasing the metal disk from the original plate; and punching through the released metal disk in a predetermined size (for example, see Japanese Patent Application Laid-Open No. 2001-256644).

SUMMARY OF THE INVENTION

However, due to deformation occurred during working such as the release step for releasing the metal disk from the original plate or the punch out step for punching out the metal disk, the prior art master disk manufactured by the above steps, is not always flat, rather it has warp or distortion. In addition, there is a photo-etch step as a substitutional step of the punch out step after electroforming, but in this case, warp or distortion may occur.

During performing magnetic transfer, in order to transfer a signal with good quality, it is important to allow the master disk and the slave disk to be in close contact with each other without spacing. However, as mentioned above, since warp has occurred in the mater disk, when it is allowed to be in close contact with the slave disk, enhancing the close contact pressure during transferring, or improving the flatness of a holder holding the master disk, or the like, is performed.

However, enhancing the close contact pressure may break the concavo-convex pattern formed on the master disk or produce deformation in the pattern, resulting in a cause to reduce the durability performance of the master disk.

At the same time, shape deformation such as warp or distortion, or shape deformation evaluated by terms such as edge face shear drop and ski jump occurs in the slave disk to which a signal is transferred. Therefore, in order to transfer a signal to a desired location, higher close contact property is required. There have been a problem that, if the close contact property is low, the intensity of the transferred signal becomes low due to spacing between the master disk and the slave disk, thereby, good transfer is not performed.

The present invention is devised in view of such a situation, and intended to provide a master disk bearing information to be transferred by magnetic transfer, which has high flexibility, and high close contact property with respect to a slave disk to be transferred.

In order to achieve the above-mentioned object, in a first aspect of the present invention, is provided a master disk for magnetic transfer, including a master substrate which is comprised of metal material having a crystal structure of face-centered cubic lattice and has a concavo-convex pattern corresponding to transfer information formed thereon, and a magnetic layer film-formed on the concavo-convex pattern of the master substrate, comprising: a X-ray diffraction pattern of the master substrate having a 200 plane reflection at $2\theta=51.0°$ to $53.0°$, and a 220 plane reflection at $2\theta=75.5°$ to $76.5°$, when incident angle of X-ray is designated by $\theta$; and a reflection intensity ratio of the 220 plane with respect to the 200 plane which is $I[220]/I[200]=2$ to $30$, when the reflection intensity of the 200 plane X-ray diffraction is designated by $I[200]$ and the reflection intensity of the 220 plane X-ray diffraction is designated by $I[220]$.

In addition, in a second aspect, is provided a master disk for magnetic transfer, including a master substrate which is comprised of metal material having a crystal structure of face-centered cubic lattice and has a concavo-convex pattern corresponding to transfer information formed thereon, and a magnetic layer film-formed on the concavo-convex pattern of the master substrate, comprising: a X-ray diffraction pattern of the master substrate having a 200 plane reflection at $2\theta=51.0°$ to $53.0°$, and a 111 plane reflection at $2\theta=43.5°$ to $45.5°$, when incident angle of X-ray is designated by $\theta$; and a reflection intensity ratio of the 111 plane with respect to the 200 plane which is $I[111]/I[200]=1$ to $8$, when the reflection intensity of the 200 plane X-ray diffraction is designated by $I[200]$ and the reflection intensity of the 111 plane X-ray diffraction is designated by $I[111]$.

In addition, in a third aspect, is provided a master disk for magnetic transfer, including a master substrate which is comprised of metal material having a crystal structure of face-centered cubic lattice and has a concavo-convex pattern corresponding to transfer information formed thereon, and a magnetic layer film-formed on the concavo-convex pattern of the master substrate, comprising: a X-ray diffraction pattern of the master substrate having a 200 plane reflection at $2\theta=51.0°$ to $53.0°$, and a 311 plane reflection at $2\theta=92.0°$ to $94.0°$, when incident angle of X-ray is designated by $\theta$; and a reflection intensity ratio of the 311 plane with respect to the 200 plane which is $I[311]/I[200]=0.3$ to $3.0$, when the reflection intensity of the 200 plane X-ray diffraction is designated by $I[200]$ and the reflection intensity of the 311 plane X-ray diffraction is designated by $I[311]$.

In addition, in a fourth aspect, is provided a master disk for magnetic transfer, including a master substrate which is comprised of metal material having a crystal structure of face-centered cubic lattice and has a concavo-convex pattern corresponding to transfer information formed thereon, and a magnetic layer film-formed on the concavo-convex pattern of the master substrate, comprising: a reflection intensity ratio of a 111 plane with respect to a 200 plane which is I[111]/I[200] =1 to 8; and a reflection intensity ratio of a 220 plane with respect to a 200 plane which is I[220]/I[200]=2 to 25, when incident angle of X-ray is designated by θ, the X-ray diffraction pattern of the master substrate has the 200 plane reflection at 2θ range of 51.0° to 53.0°, the 220 plane reflection at 2θ=75.5° to 76.5°, and the 111 plane reflection at 2θ=43.5° to 45.5°, and when the reflection intensity of the 200 plane X-ray diffraction is designated by I[200], the reflection intensity of the 220 plane X-ray diffraction is designated by I[220], and the reflection intensity of the 111 plane X-ray diffraction is designated by I[111].

Crystal structure body differs in flexibility depending on the crystal orientation, but according to the present invention, since the crystal structure of the substrate material of the master disk for magnetic transfer is defined as mentioned above, the material has high flexibility and excellent close contact property with respect to the slave disk, enabling to perform good magnetic transfer.

In addition, in a fifth aspect, the metal material in the invention claimed in any one of the first aspect, the second aspect, the third aspect, or the fourth aspect, is nickel (Ni). Various kinds of metals can be used as a master substrate, but a Ni electroformed layer is most preferable.

As described above, since, according to the master disk for magnetic transfer of the present invention, its crystal structure is defined such that the flexibility of the master substrate made of metal material is enhanced, during magnetic transfer, the master disk has excellent close contact property with the slave disk, enabling to perform good magnetic transfer.

BRIEF DESCRIPTION OF THE DRAWINGS

FIG. 4A is a process chart of one embodiment of the manufacturing method of the master disk of the present invention;

FIG. 4B is a process chart of one embodiment of the manufacturing method of the master disk of the present invention;

FIG. 4C is a process chart of one embodiment of the manufacturing method of the master disk of the present invention;

FIG. 4D is a process chart of one embodiment of the manufacturing method of the master disk of the present invention;

FIG. 4E is a process chart of one embodiment of the manufacturing method of the master disk of the present invention;

DETAILED DESCRIPTION OF THE PREFERRED EMBODIMENTS

Now, according to the drawings, preferable embodiments of the master disk according to the present invention will be described.

Figure 1:
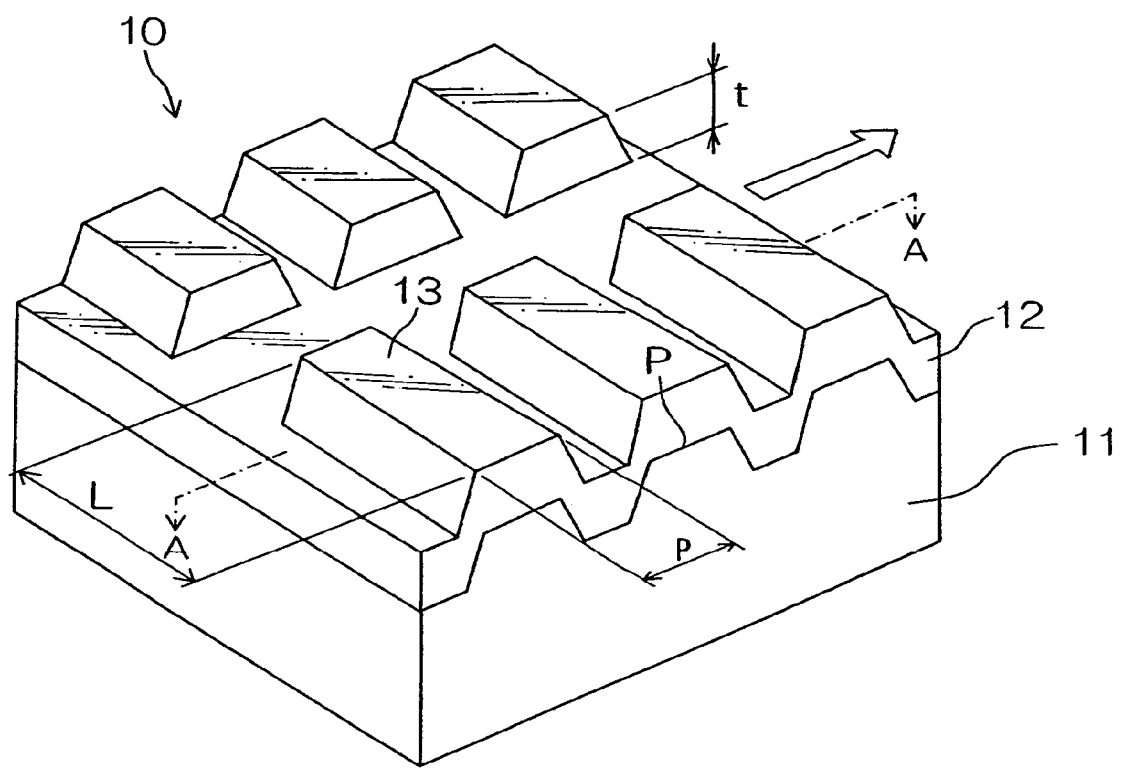
FIG. 1 is a partially perspective view of the master disk of the present invention.
Figure 2:
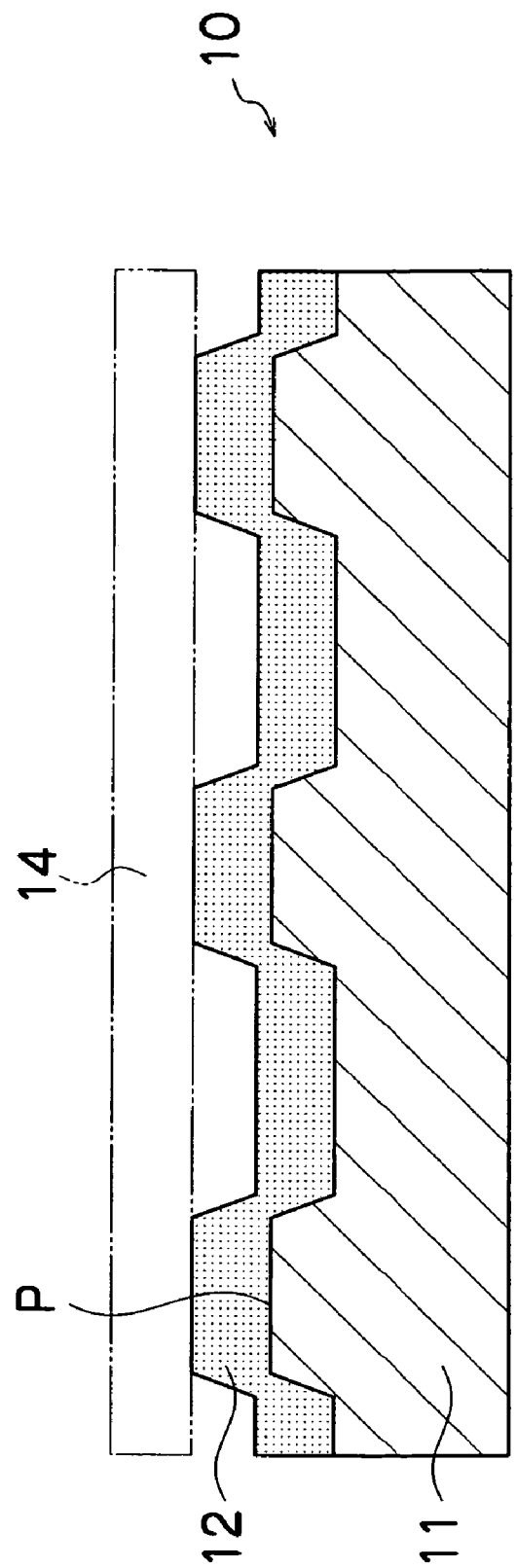
FIG. 2 is a sectional view along the line A-A of FIG. 1.

FIG. 1 is a partially perspective view of a master disk 10 for magnetic transfer (hereinafter referred to as a master disk 10) of the present invention, and FIG. 2 is a sectional view along the line A-A in FIG. 1 showing a disk to be transferred (slave disk 14) by an imaginary line.

As shown in FIG. 1 and FIG. 2, the master disk 10 is configured with a master substrate 11 made of metal and a magnetic layer 12, and has a fine concavo-convex pattern P (for example, servo information pattern) corresponding to the transfer information on the surface of the master substrate 11, and the magnetic layer 12 is coated on the concavo-convex pattern P.

In this manner, an information bearing surface 13 having the fine concavo-convex pattern P on which the magnetic layer 12 is formed on one surface of the master substrate 11. As understood from FIG. 1, the fine concavo-convex pattern P is a rectangle as viewed in a plane, and consisted of a length p in the track direction (the direction of the arrow in the figure), and a length L in the radial direction with the magnetic layer 12 being formed.

The optimum values of the length p and the length L differ depending on the recording density and the wave shape of recording signal, but it is possible to allow the length p to be 80 nm, and the length L to be 200 nm. The fine concavo-convex pattern P, when it is used for the servo signal, is formed longer in the radial direction. In this case, it is preferable that the length L in the radial direction is 0.05 to 20 μm, and the length p in the track direction (circumferential direction) is 0.01 to 5 μm.

As a pattern bearing a servo signal, it is preferable to select a concavo-convex pattern P that is longer in the radial direction, within the ranges. As depth t (the height of a spike) of the concavo-convex pattern P, it is preferable to be within the range of 30 to 800 nm, more preferably to be within the range of 50 to 300 nm.

Figure 3:
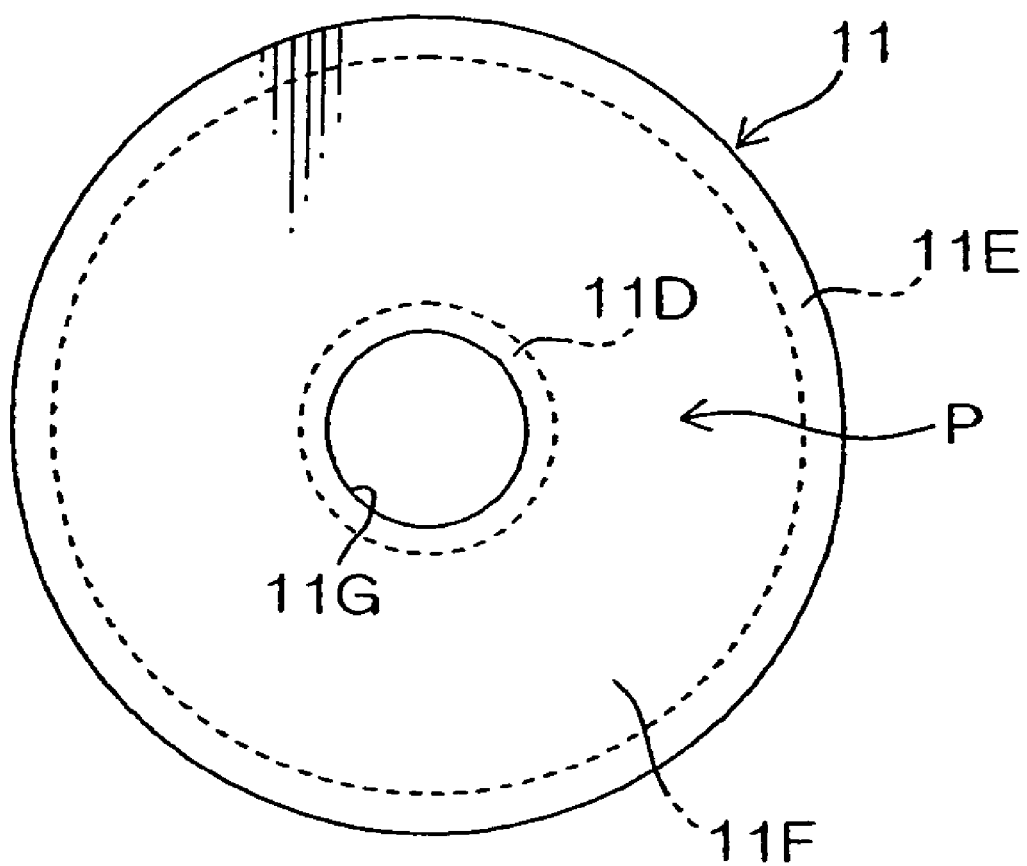
FIG. 3 is a plane view of the master substrate.

The master substrate 11 is formed by electroforming, and as shown in FIG. 3, formed in a disk shape with a center hole 11G, on which one surface (information bearing surface 13) a concavo-convex pattern P is formed in a circular region 11F except the inner circumferential part 11D and the outer circumferential part 11E. The details of the manufacture of the master substrate 11 will be described later, but it is manufactured mainly by: an electroformation step for subjecting electroforming to an original plate with information formed thereon by the concavo-convex pattern P, and forming a metal disk made of the electroformed layer, on the original plate to transfer the concavo-convex pattern P on the metal disk; and a release step for releasing the metal disk from the original plate.

In the present invention, various kinds of metals or metal alloys can be used as an electroformed layer, but in a first aspect, as a preferable example, the example of Ni electroformed layer will be described below. In order to have flexibility, the Ni electroformed layer is electroformed while controlling the current density during electroforming, so as to have a defined crystal structure as will be described later.

Next, the manufacturing method of a master disk 10 of the present invention configured as mentioned above, will be described in detail.

FIGS. 4A to 4E are process charts showing the steps for manufacturing the master disk 10. First, as shown in FIG. 4A, a preprocessing such as forming a close contact layer is performed on an original plate 15 made of a silicon wafer (glass plate, quartz plate also may be used) of which surface is flat and clean, the plate 15 is coated with electron beam resist liquid by spin coating or the like, to form a resist film 16, and baking is performed.

After that, using an electron beam exposure machine having a high precision rotating stage or an X-Y stage (not shown), an electron beam B modulated correspondingly to the servo signal or the like is irradiated on the original plate 15 mounted on the stage, and a desired concavo-convex pattern P' is rendered and exposed on the resist film 16.

Next, as shown in FIG. 4B, development of the resist film 16 is performed, and the exposed part is removed to form the desired concavo-convex pattern P' by the resist film 16. A Ni conductive film (not shown) is provided on the concavo-convex pattern P' by sputtering, for example, and an original plate 17 which can be electroformed is produced.

Next, as shown in FIG. 4C, electroforming processing is subjected on the entire surface of the original plate 17 with an electroforming apparatus, and a metal disk 18 made of Ni metal (Ni electroformed layer) having a desired thickness is laminated. Ni has a crystal structure of face-centered cubic lattice, thereby, by controlling the current density during electroforming, Ni is electroformed so as to have the defined crystal structure.

According to the first aspect, the crystal structure of the Ni electroformed layer is allowed to be a crystal structure such that, when incident angle of X-ray is designated by $\theta$, the X-ray diffraction pattern has a 200 plane reflection at $2\theta=51.0°$ to $53.0°$, and a 220 plane reflection at $2\theta=75.5°$ to $76.5°$, and when the reflection intensity of the 200 plane X-ray diffraction is designated by I[200] and the reflection intensity of the 220 plane X-ray diffraction is designated by I[220], the reflection intensity ratio of the 220 plane with respect to the 200 plane is I[220]/I[200]=2 to 30, more preferably, 2 to 10.

In addition, according to a second aspect, the crystal structure is allowed to be a crystal structure such that, when incident angle of X-ray is designated by $\theta$, the X-ray diffraction pattern has a 200 plane reflection at $2\theta=51.0°$ to $53.0°$, and a 111 plane reflection at $2\theta=43.5°$ to $45.5°$, and when the reflection intensity of the 200 plane X-ray diffraction is designated by I[200] and the reflection intensity of the 111 plane X-ray diffraction is designated by I[111], the reflection intensity ratio of the 111 plane with respect to the 200 plane is I[111]/I[200]=1 to 8, more preferably, 1 to 5.

In addition, according to a third aspect, the crystal structure is allowed to be a crystal structure such that, when incident angle of X-ray is designated by $\theta$, the X-ray diffraction pattern has a 200 plane reflection at $2\theta=51.0°$ to $53.0°$, and a 311 plane reflection at $2\theta=92.0°$ to $94.0°$, and when the reflection intensity of the 200 plane X-ray diffraction is designated by I[200] and the reflection intensity of the 311 plane X-ray diffraction is designated by I[311], the reflection intensity ratio of the 311 plane with respect to the 200 plane is I[311]/I[200]=0.3 to 3.0, more preferably, 0.4 to 1.0.

Further, according to a forth aspect, the crystal structure is allowed to be a crystal structure such that, when incident angle of X-ray is designated by $\theta$, the X-ray diffraction pattern has a 200 plane reflection at $2\theta=51.0°$ to $53.0°$, a 220 plane reflection at $2\theta=75.5°$ to $76.5°$, and a 111 plane reflection at $2\theta=43.5°$ to $45.5°$, and when the reflection intensity of the 200 plane X-ray diffraction is designated by I[200], the reflection intensity of the 220 plane X-ray diffraction is designated by I[220], and the reflection intensity of the 111 plane X-ray diffraction is designated by I[111], the reflection intensity ratio of the 220 plane with respect to the 200 plane, I[220]/I[200]=2 to 25, more preferably, 5 to 15, and the reflection intensity ratio of the 111 plane with respect to the 200 plane, I[111]/I[200]=1 to 8, more preferably, 2 to 5.

In structural analysis of a material having a crystal structure by use of XRD (X-ray Diffractometer), monochromatic X-ray irradiated on the sample is diffracted by each lattice plane of the sample, and appears strongly only in the directions which satisfy Bragg's equation, $2d \cdot \sin\theta = n\lambda$ (n: integer), where lattice spacing is designated by d, the wavelength of X-ray is designated by $\lambda$, and the angle between the lattice plane and the incident ray is designated by $\theta$. The X-rays that appear strongly in specific directions are referred to as diffraction lines.

Therefore, the diffraction lines would appear in the directions of $2\theta$ with respect to the directions of incident rays, which are the double angles of $\theta$ defined by Bragg's equation with respect to various kinds of lattice spacing d. In X-ray Diffractometer, the double angles $2\theta$ are measured.

Figure 5:
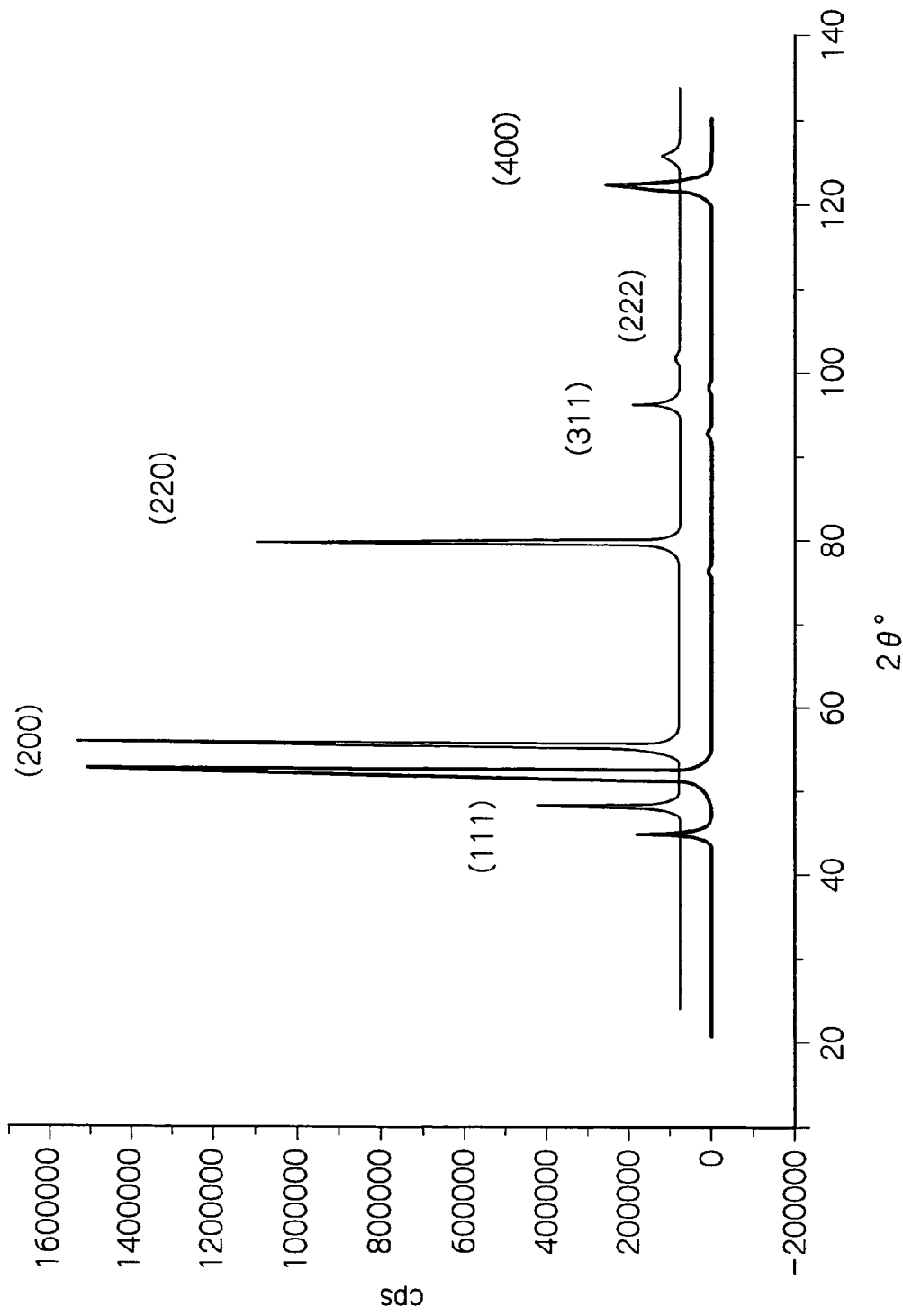
FIG. 5 is a spectrum view illustrating one example of the crystal structure analysis by X-ray diffraction.

FIG. 5 is a view showing one example of spectrum of crystal structure analysis with an XRD. In FIG. 5, the double angle $2\theta$ (degrees) is shown in the horizontal axis, and the reflection intensity of diffraction is shown in the vertical direction. As shown in FIG. 5, the peaks of the reflection intensity of diffraction appear at specific angles of $2\theta$. The peak locations are referred to standard spectra (JCPD cards, or ASTM cards) to identify the lattice plane.

Next, the metal disk 18 having a crystal structure defined as mentioned above is released from the original plate 17, and remaining resist film 16 is removed and cleaned. By this step, as shown in FIG. 4D, an original disk 11' of a master substrate 11, is attained, which has an inversed concavo-convex pattern P, and an outer diameter D before being punched into a predetermined size.

The original disk 11' is punched out, thereby, resulting in the master substrate 11, which is shown in FIG. 4E and has the predetermined size of an outer diameter d. By film forming a magnetic layer 12 on the surface of the concavo-convex pattern of the master substrate 11, a master disk 10 can be manufactured.

In addition, as for the other manufacturing process of the master disk 10, the original plate 17 is subjected to electroformation to produce a second original plate. Further, electroformation may be performed using the second original plate to make a metal disk having an inversed concavo-convex pattern, and the disk may be punched out to make a master substrate.

Further, a third original plate may be made by performing electroforming on the second original plate or by pressing resin liquid to harden it, a metal disk may be made by performing electroforming on the third original plate, and further a master substrate may be made by releasing the metal disk having an inversed concavo-convex pattern. The second or the third original plate can be used repeatedly to make plural metal disks 18.

In addition, in the production of the original plate, after etching a resist film after exposing and developing the resist film, the resist film may be removed to form a concavo-convex pattern due to etching on the surface of the original plate.

As for the formation of a magnetic layer 12, it is formed by film formation of a magnetic material using a vacuum film forming device such as a vacuum deposition process, a sputtering process, and an ion plating process, or an electroplating process, a coating process, or the like. As the magnetic material of the magnetic layer, Co, Co alloy (CoNi, CoNiZr, CoNbTaZr, etc.), Fe, Fe alloy, (FeCo, FeCoNi, FeNiMo, FeAlSi, FeAl, FeTaN, etc.), Ni, and Ni alloy (NiFe etc.) can be used. Especially, FeCo and FeCoNi can be used preferably. As the thickness of the magnetic layer 12, it is preferable to be in a range of 50 to 500 nm, more preferably, in a range of 100 to 400 nm.

It is preferable to provide a protective film such as diamond like carbon (DLC), and sputtered carbon, and further a lubricant layer may be provided on the protection film. In this case, a configuration composed of the DLC film having a thickness of 3 to 30 nm as the protective layer and the lubricant layer, is preferable.

In addition, a close contact reinforcing layer such as Si, may be provided between the magnetic layer and the protection film. The lubricant has an effect to improve the durability degradation such as occurrence of flaw due to friction when a deviation occurred during a process for contacting with the slave disk 14 is corrected.

According to the present invention, during laminating of the metal disk 18 by electroforming, the crystal structure is defined such that a flexible Ni electroformed layer is formed. Namely, by changing the current density of current to be carried in a Ni electroforming bath, while immersing the original plate 17 provided with a Ni conducting film in the Ni electroforming bath to rotate at a rotating speed of 50 to 150 rpm, the electroformed layer with a desired crystal structure is formed.

Usually, the metal used for the master disk 10 is nickel (Ni), but if the master disk 10 is manufactured by electroforming, it is preferable to use a nickel sulfamate bath in which a master substrate 11 with small stress tend to be attained.

The nickel sulfamate bath is a bath which includes 400 to 800 g/L of nickel sulfamate, and 20 to 50 g/L of boracic acid (supersaturated) as a base, and, if necessary, an additive such as surfactant (for example, sodium lauryl sulfate) is added. The bath temperature of the plating bath is preferably 40 to 60° C. For the counter electrode during electroforming, it is preferable to use a nickel ball contained in a titanium case.

Figure 6:
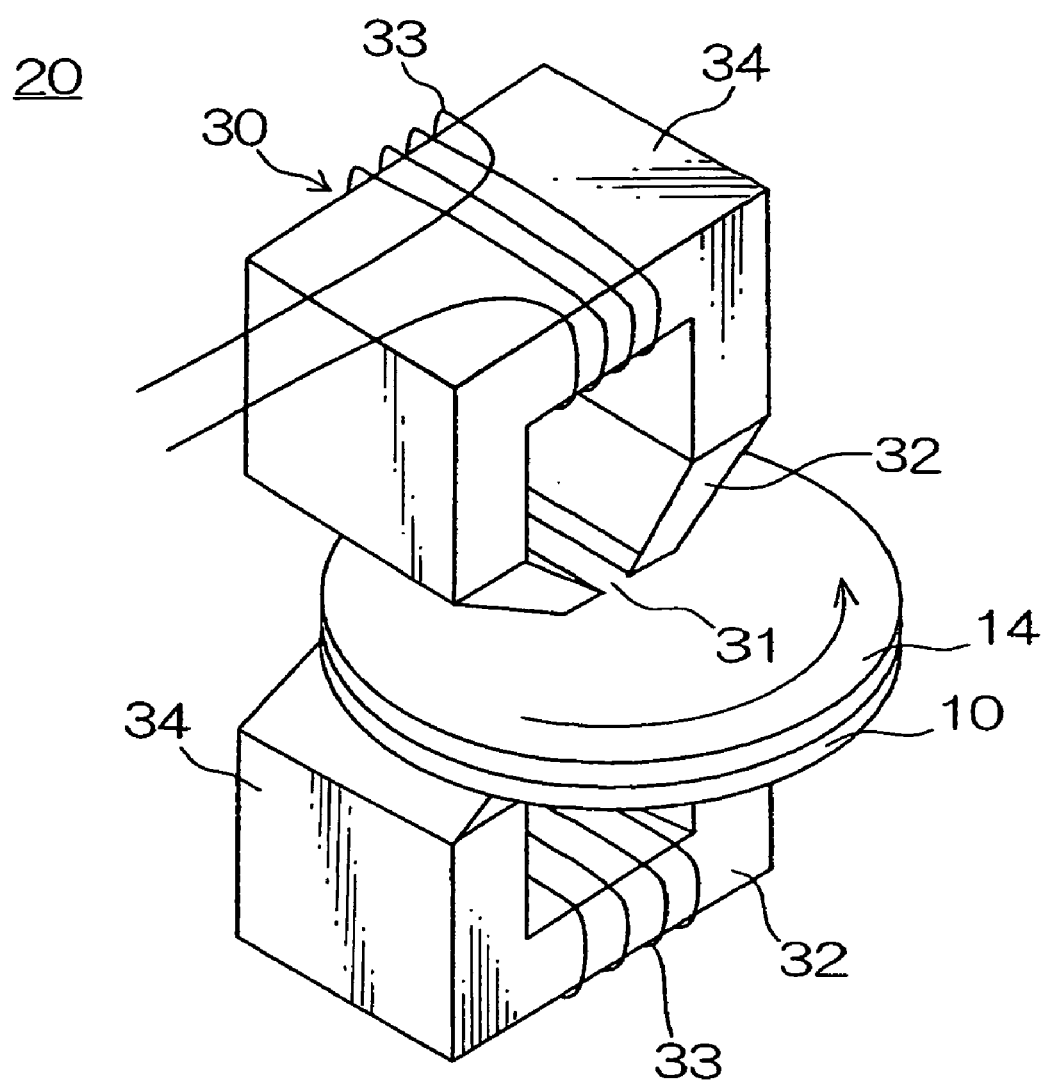
FIG. 6 is a main part perspective view of the magnetic transfer device.

Next, a magnetic transfer process will be described, in which a concavo-convex pattern P on the master disk 10 manufactured, as mentioned above is transferred on a slave disk 14. FIG. 6 is a main part perspective view of a magnetic transfer device 20 for performing magnetic transfer using the master disk 10 according to the present invention.

During magnetic transferring, the slave surface (magnetic recording surface) of the slave disk 14 shown in FIG. 8A, after performing initial DC magnetization, which will be described below, is allowed to be in contact with the information bearing surface 13 of the master disk 10, and allowed to be in close contact with it by a predetermined suppress strength. The concavo-convex pattern P is transferred on the slave disk 14, by applying a transfer magnetic field to the disk through a magnetic field generating device 30, while allowing the slave disk 14 and the master disk 10 to be in close contact with each other.

The slave disk 14 is a disk-like recording medium such as a hard disk, a flexible disk, in which a magnetic recording layer is formed on one or both surfaces, and, if necessary, cleaning (burnishing etc.) for removing microspikes and adhered dust on the surface by a glide head and an polishing body etc. is subjected to the slave disk before it is in close contact with the master disk 10.

As the magnetic recording layer of the slave disk 14, a coating type magnetic recording layer, an electroplating type magnetic recording layer, or a metal thin film type magnetic recording layer can be employed. As the magnetic material of the metal thin film type magnetic recording layer, Co, Co alloy (CoPtCr, CoCr, CoPtCrTa, CoPtCrNbTa, CoCrB, and CoNi etc.), Fe, Fe alloy (FeCo, FePt, and FeCoNi etc.), Ni, and Ni alloy (NiFe etc.) can be used.

These are preferable, because they have large magnetic flux density, and magnetic anisotropy in the same direction as that of the applied magnetic field (in-plane direction if in-plane recording), thereby, clear transfer can be performed. Moreover, in order to provide necessary anisotropy to the bottom of the magnetic material (support body side), it is preferable to provide a non-magnetic underlying layer to the bottom. It is required for the underlying layer that its crystal structure and lattice constant match with those of the magnetic layer 12. To that end, it is preferable to use Cr, CrTi, CoCr, CrTa, CrMo, NiAl, Ru, or the like.

With regard to the magnetic transfer through the master disk 10, there are two cases. In one case, the transfer is performed on one surface of the slave disk 14 while allowing the master disk 10 to be in close contact with the other surface, and in the other case, not shown, the transfer is performed on both surfaces of the slave disk 14 while allowing a pair of master disks 10 to be in close contact with both surfaces at the same time.

Figure 7:
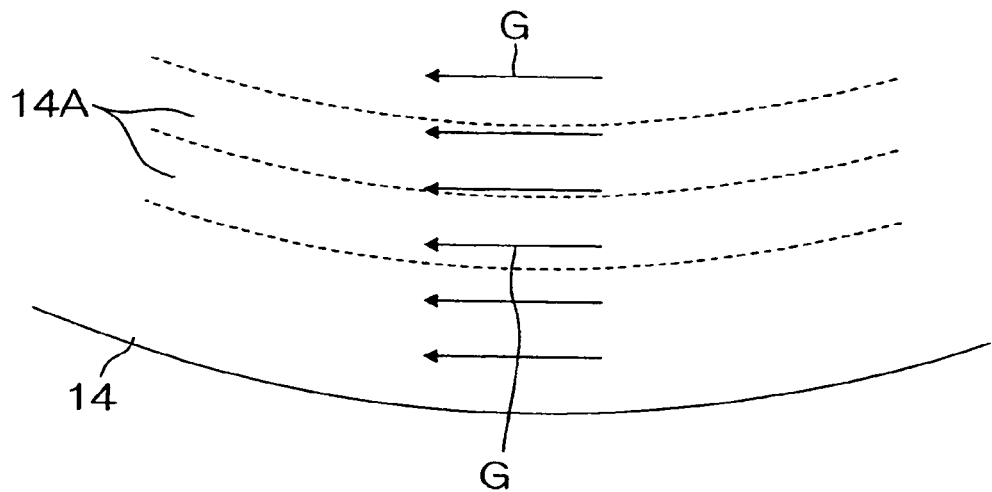
FIG. 7 is a plane view showing the method for applying a transfer magnetic field.

The magnetic field generating device 30 for applying the transfer magnetic field, in which electromagnet devices 34, 34, cores having gaps 31 extending in the radial directions of the slave disk 14 and master disk 10 held in close contact with each other, and coil 33 wound thereon, are disposed at both sides of above and below the disks, applies the transfer magnetic field in the same direction at both sides, which has magnetic field lines G (see FIG. 7) in parallel with the track directions. FIG. 7 shows the relation between circumferential tracks 14A, 14A . . . and the magnetic field lines G.

During applying the transfer magnetic field, the magnetic field is applied through the magnetic field generating device 30, while rotating the slave disk 14 and the master disk 10 in a unified manner, and the concavo-convex pattern of the master disk 10 is magnetically transferred on the slave surface of the slave disk 14. In addition, besides this configuration, the magnetic field generating device may be rotated and moved instead.

The transfer magnetic field generates a magnetic field having a magnetic field intensity distribution, in a part of the track direction, in which magnetic field intensity is below the maximum value in the optimum intensity range of the transfer magnetic field (0.6 to 1.3 times of the coercive force Hc of the slave disk 14) in any track direction, and exists within the optimum intensity range of the transfer magnetic field at least one part in one track direction, and the magnetic field intensity in the inverse track directions is below the minimum value in the optimum intensity range of the transfer magnetic field in any track direction.

Figure 8A:
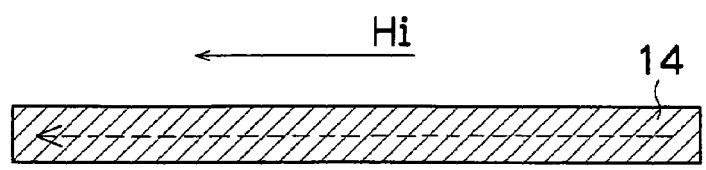
FIG. 8A is a process view showing the basic process of magnetic transfer method.
Figure 8B:
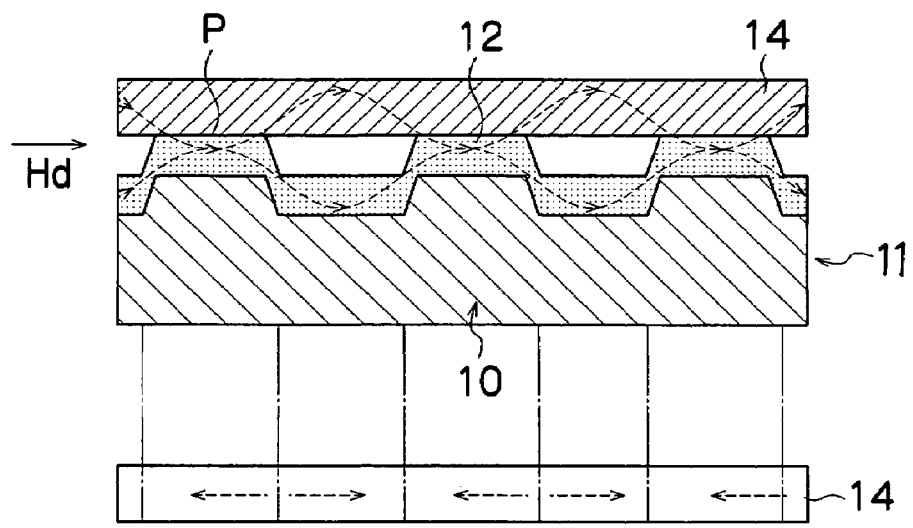
FIG. 8B is a process view showing the basic process of magnetic transfer method.
Figure 8C:
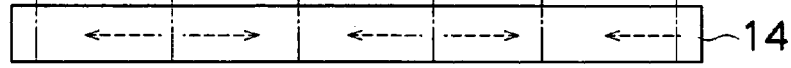
FIG. 8C is a process view showing the basic process of magnetic transfer method.

FIGS. 8A to 8C are illustrative views illustrating the basic process of the magnetic transfer method using in-plane recording. First, as shown in FIG. 8A, by applying initial magnetic field Hi to the slave disk 14 in one direction of the track directions to subject initial magnetization (DC demagnetization) to the disk, preliminarily.

Next, as shown in FIG. 8B, magnetic transfer is performed by allowing the recording surface (magnetic recording part) of the slave disk 14 and information bearing surface 13 on which a concavo-convex pattern P of the master disk 10 is formed, to be in close contact with each other, and by applying the transfer magnetic field Rd to the slave disk 14 in its track directions and in the reverse direction to that of the initial magnetic field Hi. As the result of the fact that the convex parts of the concavo-convex pattern P of the magnetic layer 12 absorb the transfer magnetic field Hd, thereby, magnetizations of that parts are not reversed, and magnetizations of other parts are reversed, as shown in FIG. 8C, the concavo-convex pattern P of the master disk 10 is magnetically transferred and recorded to the magnetic recording surface of the slave disk 14.

In such magnetic transfer, it is critical for performing high accuracy transfer to allow the slave disk 14 and the master disk 10 to be in close contact with each other well, and good close contact can be performed by using the master disk 10 of the present invention, which is superior in flexibility.

Figure 9:
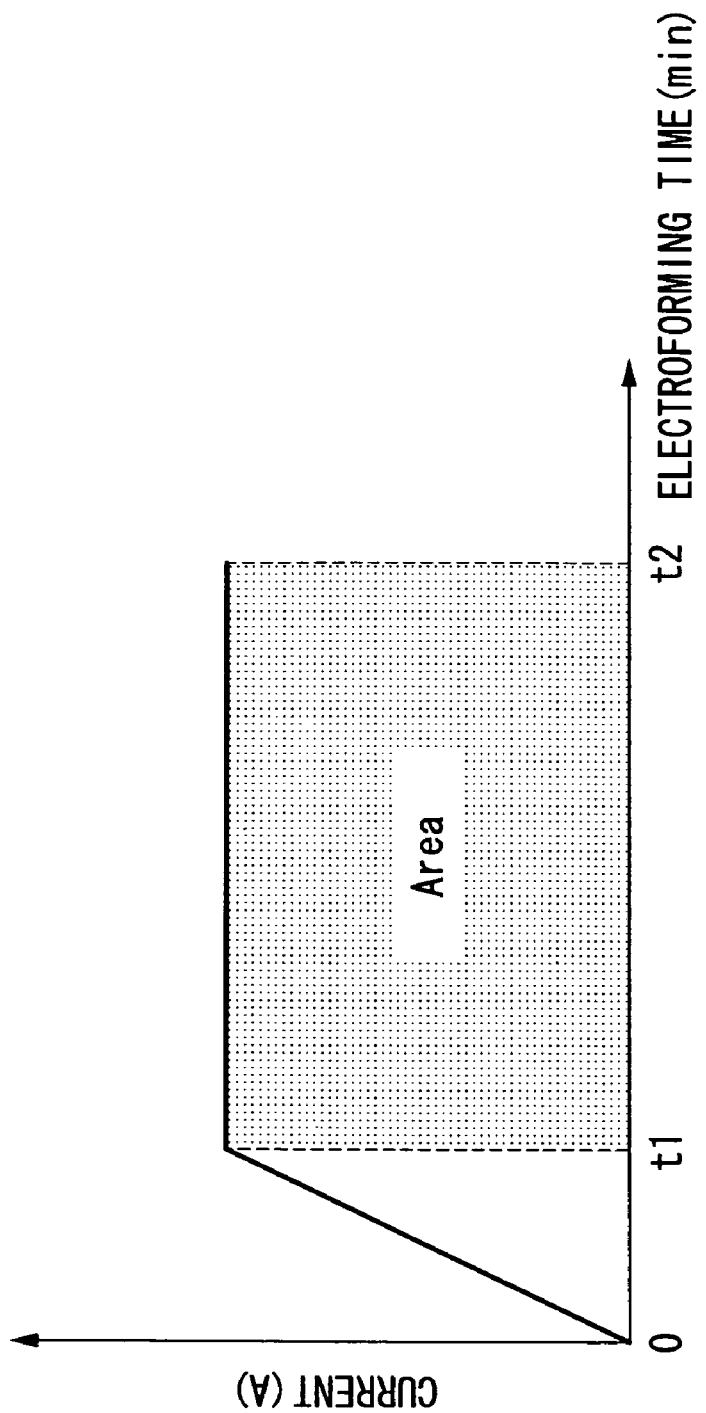
FIG. 9 is a diagram of current and electroforming time in the electroforming for producing the master substrate.

Next, examples of the present invention and comparative examples will be described. The present invention is not intended to be limited to the examples. First, common elements of the following examples and comparative examples will be described. In order to form intended Ni electroformed layer, during electroforming, current density is changed. FIG. 9 is a graph showing current (A) and electroforming time (min) during electroforming. In all examples, current was raised to current density during electroforming in a rising time (0-t1 in the figure) of 15 min, and the electroforming time was adjusted such that the area designated by Area in the figure is to 5000A·m.

In addition, for X-ray diffractometry, X-ray diffractometer RINT2500 made by Rigaku Corporation, was used. Conditions: Cu X-ray tube (λ=1.53), accelerating voltage; 55 KV, 280 A, 2θ=20° to 130°, step width =0.05°, count time; 4 sec, divergence slit=1 deg, scattering slit=1 deg, receiving slit=0.3 mm, were used as the measuring conditions.

In addition, the evaluation of the produced master substrate 11 were performed as follows: First, a magnetic layer 12 was formed by film-forming on the concavo-convex pattern P side of the produced master substrate 11 to complete a master disk 10, it is allowed to be in close contact with the slave disk 14 to apply transfer magnetic field to them, and information was magnetically transferred.

The signal output of the slave disk 14 on which the information was magnetically transferred, was read by a scanning head, the fluctuation of the output (signal amplitude intensity) per one track was represented by modulation (%), and the evaluation was performed by the modulation value (Mod).

Mod value, which is fluctuation of outputs when signal is read, of the preamble part (signal region which is used for synchronization and gain modulation during servo demodulation) of each sector of servo signal is transferred to the slave disk by magnetic transfer, occurs mainly due to irregularity (undulation) of spacing between the master disk 10 and the slave disk 14 during transferring.

Here, it is represented by the formula, $\{(M-m)/(M+m)\} \times 100$ (%), using system evaluation machine Guzik1609 made by KYODO DENSI, where M is a maximum signal amplitude, and m is a minimum signal amplitude.

If Mod value is 5% or less, good transfer quality can be obtained, however, more preferably, if it is 4% or less, very good transfer quality can be obtained, thereby, evaluation is performed if Mod value is 4% or less, or not.

EXAMPLE

Four kinds of master substrates 11, a substrate Ni electroformed at an electroforming current of 5 A (J1), a substrate electroformed at an electroforming current of 15 A (J2), a substrate electroformed at an electroforming current of 20 A (J3), and a substrate electroformed at an electroforming current of 3 A (J4), are produced.

For respective examples, angle (2θ) between each orientation plane and X-ray diffraction line, and reflection intensity ratio of X-ray diffraction between each orientation plane, are shown in (Table(1)). For respective examples of J1, J2, J3, and J4, Mod value was 3%, resulting in good signal output.

TABLE 1

|  | Example | | | | Comparative Example | |
|---|---|---|---|---|---|---|
|  | J1 | J2 | J3 | J4 | H1 | H2 |
| (200) reflection angle (2 θ) | 51.8 | 51.9 | 51.85 | 52.73 | 51.76 | 51.75 |
| (220) reflection angle (2 θ) | 76.3 | 76.3 | 76 | 75.33 | 76.32 | 76.35 |
| (111) reflection angle (2 θ) | 92.9 | 92.95 | 92.9 | 92.87 | 92.91 | 92.95 |
| (311) reflection angle (2 θ) | 44.5 | 44.45 | 44 | 44.42 | 44.42 | 44.48 |
| I[220]/I[200] | 2.37 | 4 | 8.54 | 24.3 | 0.001 | 0.001 |
| I[111]/I[200] | 2.24 | 1.9 | 2.37 | 6.9 | 0.19 | 0.32 |
| I[311]/I[200] | 0.5 | 0.59 | 0.76 | 1.8 | 0.03 | 0.03 |
| I[220]/I[200] | 2.37 | 4 | 8.54 | 24.3 |  |  |
| I[111]/I[200] | 2.24 | 1.9 | 2.37 | 6.9 |  |  |
| lattice constant a | 3.5 | 3.51 | 3.5 | 3.5 | 3.5 | 3.5 |
| Mod Value (%) | 3 | 3 | 3 | 3 | 6 | 5 |
| Electroforming current | 5 A | 15 A | 20 A | 3 A | 40 A | 60 A |

Comparative Example

Two kinds of master substrates 11, a substrate Ni electroformed at an electroforming current of 40 A (H1), and a substrate electroformed at an electroforming current of 60 A (H2), are produced. For respective comparative examples, angle (2θ) between each orientation plane and X-ray diffraction line, and reflection intensity ratio of X-ray diffraction between each orientation plane, are shown in (Table(1)).

In the comparative examples, for both of H1 and H2, reflection intensities of X-ray diffraction of 220 plane were extremely low, and the ratio with respect to reflection intensity of X-ray diffraction of 200 plane was 0.001, namely, nearly zero. In addition, Mod value was 6% for H1, and 5% for H2, thereby, evaluation was lower than that of the examples.

What is claimed is:

1. A master disk for magnetic transfer, including a master substrate which is comprised of metal material having a crystal structure of face-centered cubic lattice and has a concavo-convex pattern corresponding to transfer information formed thereon, and a magnetic layer film-formed on the concavo-convex pattern of the master substrate, comprising:
a X-ray diffraction pattern of the master substrate having a 200 plane reflection at 2θ=51.0° to 53.0°, and a 220 plane reflection at 2θ=75.5° to 76.5°, when incident angle of X-ray is designated by θ; and
a reflection intensity ratio of the 220 plane with respect to the 200 plane which is I[220]/I[200]=2 to 30, when the reflection intensity of the 200 plane X-ray diffraction is designated by I[200] and the reflection intensity of the 220 plane X-ray diffraction is designated by I[220].

2. The master disk for magnetic transfer according to claim 1, wherein the metal material is nickel (Ni).

3. A master disk for magnetic transfer, including a master substrate which is comprised of metal material having a crystal structure of face-centered cubic lattice and has a concavo-convex pattern corresponding to transfer information formed thereon, and a magnetic layer film-formed on the concavo-convex pattern of the master substrate, comprising:
a X-ray diffraction pattern of the master substrate having a 200 plane reflection at 2θ=51.0° to 53.0°, and a 111 plane reflection at 2θ=43.5° to 45.5°, when incident angle of X-ray is designated by θ; and a reflection intensity ratio of the 111 plane with respect to the 200 plane which is I[111]/I[200]=1 to 8, when the reflection intensity of the 200 plane X-ray diffraction is designated by I[200] and the reflection intensity of the 111 plane X-ray diffraction is designated by I[111].

4. The master disk for magnetic transfer according to claim 3, wherein the metal material is nickel (Ni).

5. A master disk for magnetic transfer, including a master substrate which is comprised of metal material having a crystal structure of face-centered cubic lattice and has a concavo-convex pattern corresponding to transfer information formed thereon, and a magnetic layer film-formed on the concavo-convex pattern of the master substrate, comprising:

a X-ray diffraction pattern of the master substrate having a 200 plane reflection at 2θ=51.0° to 53.0°, and a 311 plane reflection at 2θ=92.0° to 94.0°, when incident angle of X-ray is designated by θ; and a reflection intensity ratio of the 311 plane with respect to the 200 plane which is I[311]/I[200]=0.3 to 3.0, when the reflection intensity of the 200 plane X-ray diffraction is designated by I[200] and the reflection intensity of the 311 plane X-ray diffraction is designated by I[311].

6. The master disk for magnetic transfer according to claim 5, wherein the metal material is nickel (Ni).

7. A master disk for magnetic transfer, including a master substrate which is comprised of metal material having a crystal structure of face-centered cubic lattice and has a concavo-convex pattern corresponding to transfer information formed thereon, and a magnetic layer film-formed on the concavo-convex pattern of the master substrate, comprising:

a X-ray diffraction pattern of the master substrate having a 200 plane reflection at 2θ range of 51.0° to 53.0°, a 220 plane reflection at 2θ=75.5° to 76.5°, and a 111 plane reflection at 2θ=43.5° to 45.5°, when incident angle of X-ray is designated by θ; and a reflection intensity ratio of a 111 plane with respect to a 200 plane which is I[111]/I[200]=1 to 8 and a reflection intensity ratio of a 220 plane with respect to a 200 plane which is I[220]/I[200]=2 to 25, when the reflection intensity of the 200 plane X-ray diffraction is designated by I[200], the reflection intensity of the 220 plane X-ray diffraction is designated by I[220], and the reflection intensity of the 111 plane X-ray diffraction is designated by I[111].

8. The master disk for magnetic transfer according to claim 7, wherein the metal material is nickel (Ni).

* * * * *